(12) United States Patent
Lee et al.

(10) Patent No.: US 8,842,108 B2
(45) Date of Patent: Sep. 23, 2014

(54) ARRAY SUBSTRATE FOR IN-PLANE SWITCHING MODE LIQUID CRYSTAL DISPLAY DEVICE

(75) Inventors: Jae-Kyun Lee, Goyang-si (KR); Jae-Young Oh, Goyang-si (KR); Dae-Jung Choi, Paju-si (KR); Sun-Woo Kim, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 782 days.

(21) Appl. No.: 13/099,714

(22) Filed: May 3, 2011

(65) Prior Publication Data

US 2011/0273412 A1 Nov. 10, 2011

(30) Foreign Application Priority Data

May 4, 2010 (KR) .................. 10-2010-0042017

(51) Int. Cl.
*G09G 3/36* (2006.01)
*G02F 1/1362* (2006.01)
*G02F 1/1343* (2006.01)

(52) U.S. Cl.
CPC .............. *G02F 1/136209* (2013.01); *G02F 2001/136222* (2013.01); *G02F 1/134363* (2013.01)
USPC ........................... 345/206; 349/141

(58) Field of Classification Search
CPC ........ G09G 3/36; G02F 1/1343; G02F 1/1333
USPC .......... 345/206, 174; 349/141, 143, 110, 153, 349/139
See application file for complete search history.

(56) References Cited

U.S. PATENT DOCUMENTS

| 2005/0078256 A1* | 4/2005 | Hong ............................ 349/141 |
| 2007/0030432 A1* | 2/2007 | Chen et al. .................... 349/141 |
| 2007/0222923 A1* | 9/2007 | Wang et al. .................... 349/110 |

* cited by examiner

*Primary Examiner* — Quan-Zhen Wang
*Assistant Examiner* — Yuk Chow
(74) *Attorney, Agent, or Firm* — McKenna Long & Aldridge LLP (57) ABSTRACT

An array substrate for a liquid crystal display device includes: a substrate; a gate line and a data line on the substrate; a common line parallel to and spaced apart from the gate line; a thin film transistor connected to the gate line and the data line; a plurality of pixel electrodes in the pixel region; a plurality of common electrodes alternating with the plurality of pixel electrodes; at least one outermost common electrode at an edge portion of the pixel region; a black matrix corresponding to the thin film transistor, the gate line and the data line, the black matrix including an inorganic material and having an open portion; and a color filter layer in the open portion.

10 Claims, 4 Drawing Sheets

ARRAY SUBSTRATE FOR IN-PLANE SWITCHING MODE LIQUID CRYSTAL DISPLAY DEVICE

This application claims the benefit of Korean Patent Application No. 10-2010-0042017, filed on May 4, 2010, which is hereby incorporated by reference in its entirety.

BACKGROUND OF THE INVENTION

1. Field of the Invention

The present invention relates to a liquid crystal display device, and more particularly, to an array substrate for a color filter on thin film transistor type in-plane switching mode liquid crystal display device.

2. Discussion of the Related Art

A liquid crystal display (LCD) device has been widely used for a television and a monitor because of its superiority in displaying a moving image and high contrast ratio. In general, the LCD device uses the optical anisotropy and polarization properties of liquid crystal molecules to produce an image. The LCD device includes a liquid crystal panel having two substrates and a liquid crystal layer between the two substrates. The liquid crystal molecules in the liquid crystal layer are re-aligned by an electric field. Accordingly, the alignment of the liquid crystal molecules is changed in accordance with the direction of the electric field and the light transmittance of the liquid crystal panel is changed, thereby the image displayed.

Among various types LCD devices, an active matrix type liquid crystal display (AM-LCD) device has been the subject of recent research due to its high resolution and superior quality for displaying a moving image.

In the LCD device, the liquid crystal layer is driven by a vertical electric field generated between the two substrates. Although the LCD device using the vertical electric field provides a superior transmittance and a high aperture ratio, the LCD device has a narrow viewing angle. Accordingly, various other types of LCD devices having wide viewing angles, such as an in-plane switching (IPS) mode LCD device, have been developed.

Figure 1:
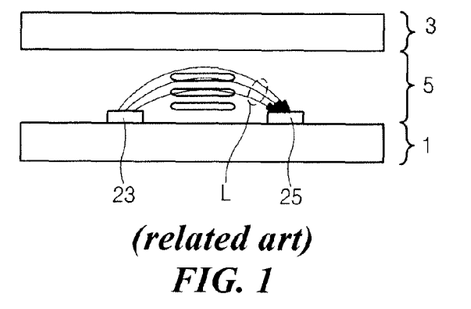
FIG. 1 is a cross-sectional view of an in-plane switching mode liquid crystal display device according to the related art.

FIG. 1 is a cross-sectional view of an in-plane switching mode liquid crystal display device according to the related art. In FIG. 1, a lower substrate 1 and an upper substrate 3 face and are spaced apart from each other. A liquid crystal layer 5 is interposed between the lower and the upper substrates 1 and 3. The lower substrate 1 and the upper substrate 3 may be referred to as an array substrate and a color filter substrate, respectively. A pixel electrode 23 and a common electrode 25 are formed on the lower substrate 1. The liquid crystal layer 5 is driven by a horizontal electric field "L" between the pixel electrode 23 and the common electrode 25.

Although not shown in FIG. 1, a gate line, a data line and a thin film transistor (TFT) are formed on an inner surface of the lower substrate 1, and a black matrix and a color filter layer are formed on an inner surface of the upper substrate 3. The lower and upper substrates 1 and 3 are attached to each other by a seal pattern including an epoxy resin.

When the lower and upper substrates 1 and 3 are attached to each other, light leakage may be generated and aperture ratio of the IPS mode LCD device may be reduced due to misalignment of the lower and upper substrates 1 and 3, i.e., attachment error. As a result, the IPS mode LCD device is fabricated based on a margin of attachment error. Specifically, since the black matrix is formed to have a width greater than a designed width based on the margin of attachment error, the aperture ratio of the IPS mode LCD device is further reduced.

For the purpose of improving the aperture ratio, a thin film transistor on color filter (TOC) type LCD device and a color filter on thin film transistor (COT) type LCD device where a TFT and a color filter layer are formed on a single substrate have been the subject of recent research.

Figure 2:
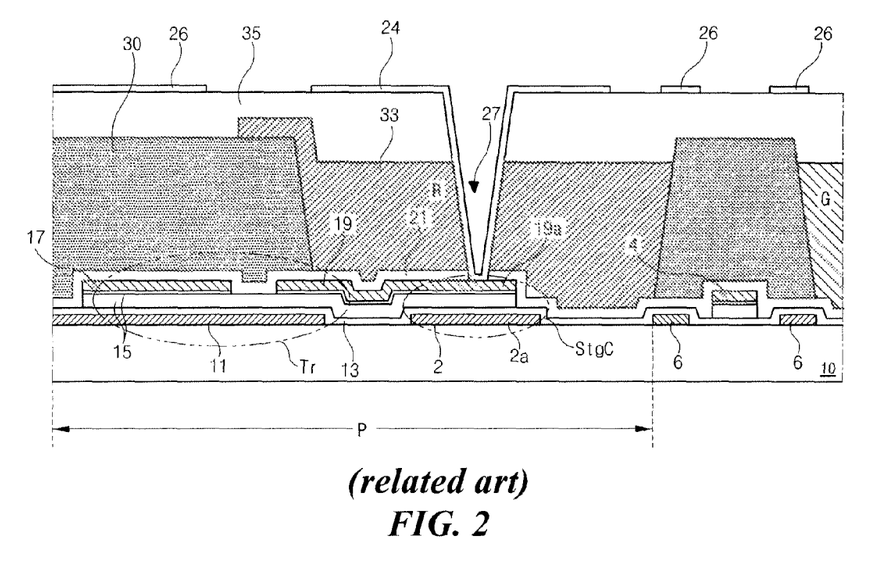
FIG. 2 is a cross-sectional view showing an array substrate for a color filter on thin film transistor type in-plane switching mode liquid crystal display device according to the related art.

FIG. 2 is a cross-sectional view showing an array substrate for a color filter on thin film transistor type in-plane switching mode liquid crystal display device according to the related art. In FIG. 2, a gate line (not shown), a common line 2 and a data line 4 are formed on a substrate 10. The common line 2 is spaced apart from and parallel to the gate line, and the data line 4 crosses the gate line to define a pixel region P. An outermost common electrode 6 extending from the common line 2 is formed at an edge portion of the pixel region P.

A thin film transistor (TFT) Tr connected to the gate line and the data line 4 includes a gate electrode 11, a gate insulating layer 13, a semiconductor layer 15, a source electrode 17 and a drain electrode 19. The drain electrode 19 extends to overlap the common line 2. The overlapped portion of the common line 2 as a first capacitor electrode 2a, the overlapped portion of the drain electrode 19 as a second capacitor electrode 19a and the gate insulating layer between the first and second capacitor electrodes 2a and 19a as a dielectric layer constitute a storage capacitor StgC.

A passivation layer 21 is formed on the TFT Tr, and a black matrix 30 of a black resin is formed on the passivation layer 21. The black matrix 30 corresponds to the gate line, the data line 4 and the TFT Tr. A color filter layer 33 including red, green and blue color filters is formed on the black matrix 30 and the passivation layer 21. The red, green and blue color filters are disposed in the pixel region P sequentially and repeatedly. An overcoat layer 35 is formed on the black matrix 30 and the color filter layer 33, and a pixel electrode 24 and a common electrode 26 are formed on the overcoat layer 35. The overcoat layer 35 and the color filter layer 33 have a drain contact hole 27 exposing the drain electrode 19 of the TFT Tr. The pixel electrode 23 is electrically connected to the drain electrode 19 through the drain contact hole 27.

In the color filter on thin film transistor (COT) type in-plane switching (IPS) mode liquid crystal display (LCD) device, the black matrix 30 prevents mixing of colors by the red, green and blue color filters to improve contrast ratio. In addition, the black matrix 30 shields incident light to the TFT Tr to prevent malfunction of the TFT Tr. For the sufficient light shielding property, the black matrix 30 is required to have an optical density equal to or greater than about 4.0, preferably, equal to or greater than about 5.0. When the black matrix 30 is formed of the black resin, the black matrix 30 has a thickness of about 1 μm to about 2 μm for the optical density equal to or greater than about 4.0.

Further, the color filter layer 33 is formed to overlap an edge portion of the relatively thick black matrix 30 and a step difference is generated at the edge portion of the relatively thick black matrix 30. The subsequent process such as a rubbing process may be deteriorated due to the step difference. Accordingly, the overcoat layer 35 is formed on the color filter layer 33 and the black matrix 30 to prevent deterioration due to the step difference. However, the fabrication process is complicated and fabrication cost increases by the overcoat layer 35.

The black matrix 30 is formed by pattering a resin layer colored with a black pigment such as a carbon black. The black matrix 30 of a black resin has a resistivity equal to or smaller than about $1 \times 10^7$ Ωcm. Accordingly, when the black matrix 30 is disposed over a conduction line such as the gate line, the data line 4 and the common line 2, a resistive-capacitive (RC) delay is caused in the conduction line and display quality is deteriorated due to a cross-talk.

Figure 3A:
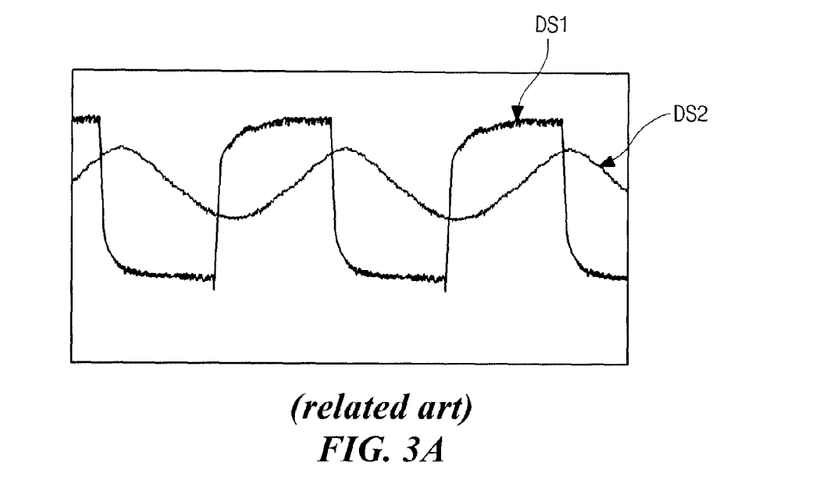
FIGS. 3A and 3B are pictures showing resistive-capacitive delay and deterioration in display quality, respectively, of a color filter on thin film transistor type in-plane switching mode liquid crystal display device according to the related art.
Figure 3B:
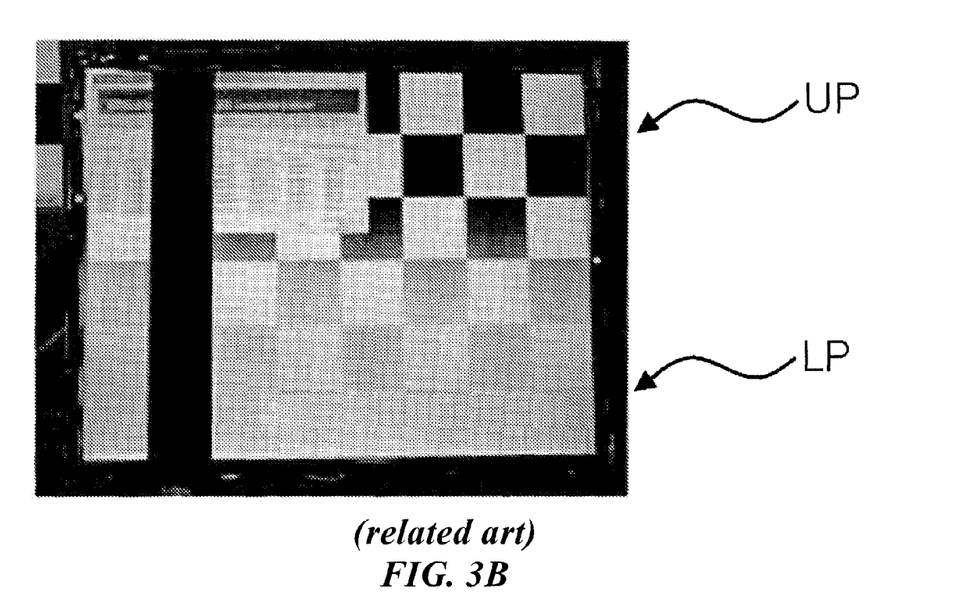

FIGS. 3A and 3B are pictures showing resistive-capacitive delay and deterioration in display quality, respectively, of a color filter on thin film transistor type in-plane switching mode liquid crystal display device according to the related art.

In FIGS. 3A and 3B, first and second data signals DS1 and DS2 correspond to upper and lower portions UP and LP of the COT type IPS mode LCD device. When the black matrix 30 is formed on the data line 4, the second data signal DS2 is delayed as compared with the first data signal DS1 such that rising and falling times of the second data signal DS2 are longer than rising and falling times of the first data signal DS1. As a result, the image of the lower portion LP has poor display quality, e.g., low contrast ratio and low brightness, as compared with the image of the upper portion UP. Accordingly, the COT type IPS mode LCD device has non-uniform display quality.

SUMMARY OF THE INVENTION

Accordingly, the present invention is directed to an array substrate for an in-plane switching mode liquid crystal display device that substantially obviates one or more of the problems due to limitations and disadvantages of the related art.

An advantage of the present invention is to provide an array substrate for a color filter on thin film transistor type in-plane switching mode liquid crystal display device where a step difference due to a color filter and a black matrix is prevented and a planarization process is omitted by using an inorganic material for the black matrix.

Another advantage of the present invention is to provide an array substrate for a color filter on thin film transistor type in-plane switching mode liquid crystal display device where a resistive-capacitive delay is prevented and a display quality is improved by using an inorganic material for the black matrix.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching mode liquid crystal display device includes: a substrate; a gate line and a data line on the substrate, the gate line and the data line crossing each other to define a pixel region; a common line parallel to and spaced apart from the gate line; a thin film transistor connected to the gate line and the data line; a plurality of pixel electrodes in the pixel region, the plurality of pixel electrodes connected to the thin film transistor and parallel to the data line; a plurality of common electrodes alternating with the plurality of pixel electrodes; at least one outermost common electrode at an edge portion of the pixel region, the at least one outermost common electrode connected to the common line and parallel to the data line; a black matrix corresponding to the thin film transistor, the gate line and the data line, the black matrix including an inorganic material and having an open portion; and a color filter layer in the open portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 4:
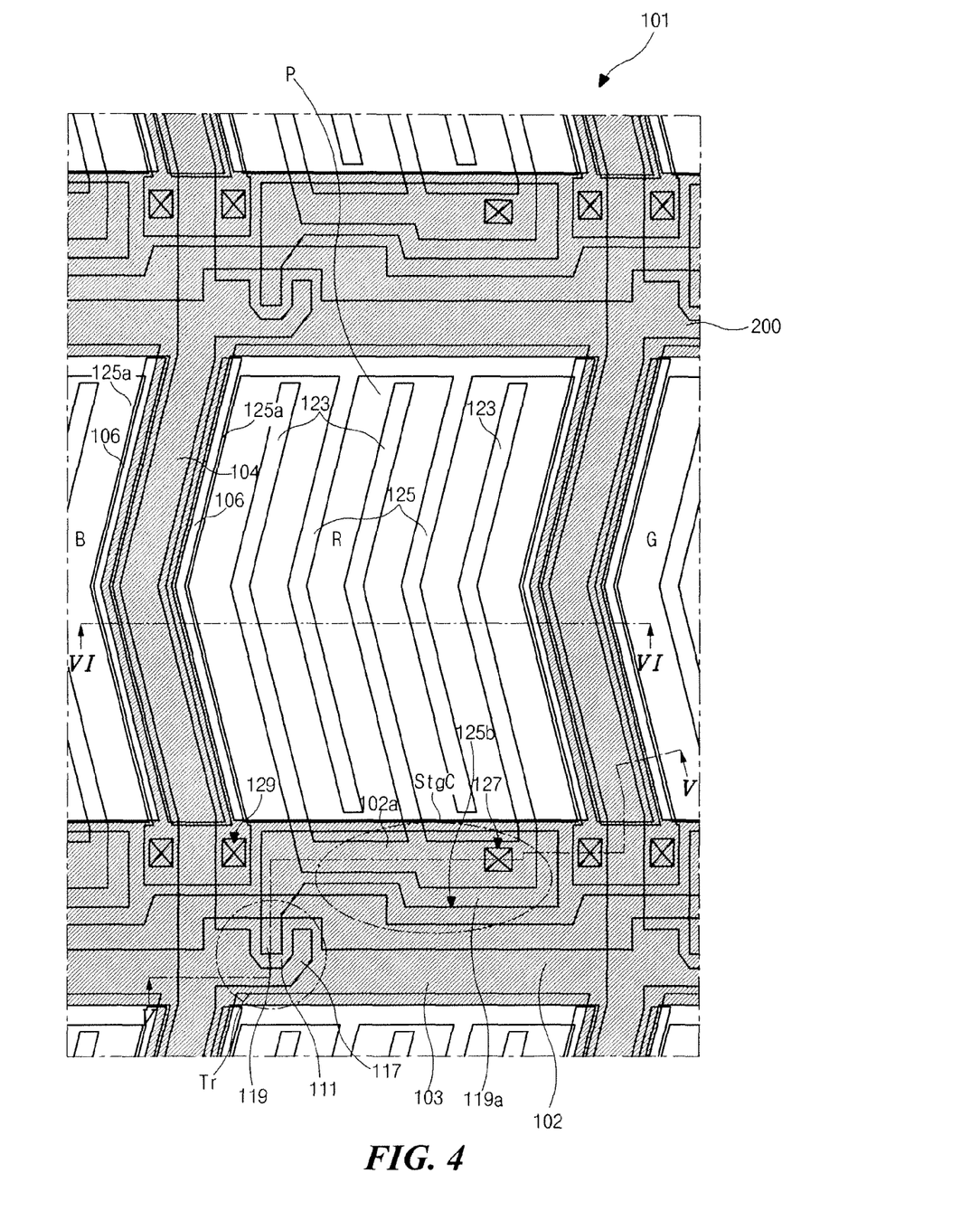
FIG. 4 is a plane view showing an array substrate for a color filter on thin film transistor type in-plane switching mode liquid crystal display device according to an embodiment of the present invention.
Figure 5:
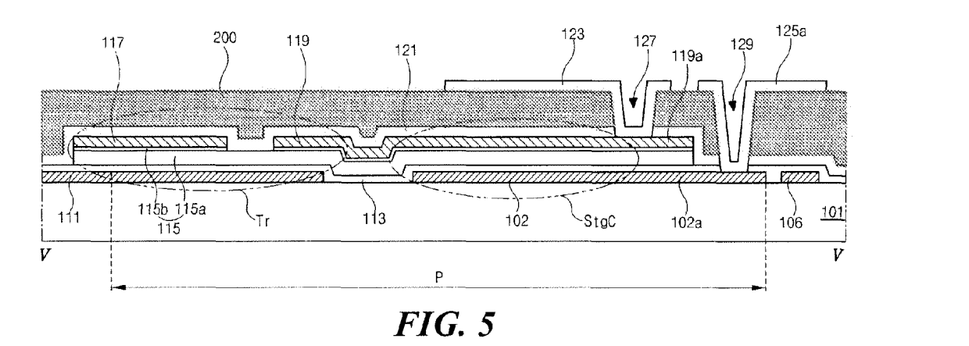
FIG. 5 is a cross-sectional view taken along a line V-V of FIG. 4.
Figure 6:
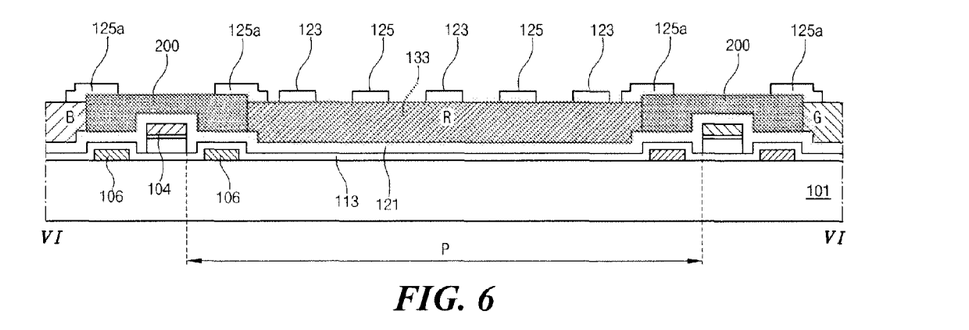
FIG. 6 is a cross-sectional view taken along a line VI-VI of FIG. 4.

FIG. 4 is a plane view showing an array substrate for a color filter on thin film transistor type in-plane switching mode liquid crystal display device according to an embodiment of the present invention, FIG. 5 is a cross-sectional view taken along a line V-V of FIG. 4, and FIG. 6 is a cross-sectional view taken along a line VI-VI of FIG. 4.

In FIG. 4, a common line 102, a gate line 103 and a data line 104 are formed on a substrate 101. The common line 102 is parallel to the gate line 103, and the gate line 103 and the data line 104 cross each other to define a pixel region P. A thin film transistor (TFT) Tr is connected to the gate line 103 and the data line 104. The TFT Tr includes a gate electrode 111, a gate insulating layer 113 (of FIG. 5), a semiconductor layer 115 (of FIG. 5), a source electrode 117 and a drain electrode 119. The gate electrode 111 is connected to the gate line 103 and the source electrode 117 is connected to the data line 104. The source and drain electrodes 117 and 119 are spaced apart from each other.

In addition, the drain electrode 119 extends to overlap the common line 102. Overlapping portions of the common line 102 and the drain electrode 119 are used as first and second capacitor electrodes 102a and 109a, respectively, such that the first and second capacitor electrodes 102a and 109a and the gate insulating layer 113 between the first and second capacitor electrodes 102a and 109a constitute a storage capacitor StgC.

Outermost common electrodes 106, a plurality of common electrodes 125 and auxiliary common electrodes 125a are formed in the pixel region P. The outermost common electrodes 106, the plurality of common electrodes 125 and the auxiliary common electrodes 125a are parallel to the data line 104 and connected to the common line 102. The outermost common electrodes 106 are disposed at edge portions of the pixel region P and spaced apart from the data line 104. The outermost common electrodes 106 extend from and have the same layer as the common line 102. The plurality of common electrodes 125 are spaced apart from each other and the auxiliary common electrodes 125a overlap the outermost common lines 106. The auxiliary common electrodes 125a have the same layer as the plurality of common electrodes 125. Further, end portions of the auxiliary common electrodes 125a and the plurality of common electrodes 125 are connected to common connecting pattern 125b.

The auxiliary common electrodes 125a are electrically connected to the common line 102 through a common line contact hole 129 and partially overlap the data line 104 to cover a space between the data line 104 and the outermost common electrodes 106. Accordingly, the auxiliary common electrodes 125a transmit a common voltage applied to the common line 102 to the plurality of common electrodes 125 and prevent deterioration such as cross-talk due to an electric field generated between the data line 104 and the outermost common electrodes 106.

A plurality of pixel electrodes 123 are formed in the pixel region P. The plurality of pixel electrodes 123 and the plurality of common electrodes 125 are alternately disposed with each other. The plurality of pixel electrodes 123 are electrically connected to the second capacitor electrode 119a extending from the drain electrode 119 through a drain contact hole 127. Further, the plurality of pixel electrodes 123 may have the same layer as the plurality of common electrodes 125.

The plurality of pixel electrodes 123 and the plurality of common electrodes 125 may have at least one bent portion to obtain a multi-domain structure. For example, each of the plurality of pixel electrodes 123 and the plurality of common electrodes 125 may be symmetrically bent with respect to a central portion thereof so that the pixel region can have a two-domain structure. Due to the two-domain structure, deterioration such as color inversion at a specific viewing angle is prevented and a viewing angle property of the COT type IPS mode LCD device is further improved. Although the data line 104, the plurality of pixel electrodes 123, the plurality of common electrodes 125 and the auxiliary common electrodes 125a are formed to have a bent portion in FIG. 4, the data line, the plurality of pixel electrodes, the plurality of common electrodes and the auxiliary common electrodes may be formed to have a straight shape without a bent portion in another embodiment.

A black matrix 200 and a color filter layer 133 (of FIG. 5) are formed on the substrate 101 having the TFT Tr. The black matrix 200 corresponds to the common line 102, the gate line 103, the data line 104 and the TFT Tr. The color filter layer 133 includes red, green and blue color filters, and each of the red, green and blue color filters are alternated disposed in the pixel region P.

The black matrix 200 includes an inorganic material. For example, the inorganic material may include one of germanium (Ge), germanium carbide (GeC) and germanium silicon (GeSi). Since an transmittance of a thin film of an inorganic material is smaller than a transmittance of a thin film of an organic material, the black matrix 200 of an inorganic material has a relatively smaller thickness as compared with the black matrix 30 (of FIG. 2) of black resin according to the related art. As a result, a step difference due to the black matrix 200 is minimized and deterioration in a subsequent process such as a rubbing process due to the step difference is prevented. Accordingly, an overcoat layer for planarization is omitted and a fabrication process is simplified.

In addition, a dielectric constant of a thin film of an inorganic material is smaller than a dielectric constant of a thin film of an organic material and a resistivity of a thin film of an inorganic material is greater than a resistivity of a thin film of an organic material. As a result, a resistive-conductive (RC) delay is minimized even when the black matrix 200 of an inorganic material is formed over the common line 102, the gate line 103 and the data line 104.

In FIGS. 5 and 6, the common line 102, the gate line 103 (of FIG. 4), the gate electrode 111 and the auxiliary common electrodes 106 are formed on the substrate 101 having the pixel region P. The gate electrode 111 is connected to the gate line 103, and the common line 102 is parallel to and spaced part from the gate line 103. The auxiliary common electrodes 106 extend from the common line 102 and are disposed at the edge portions of the pixel region P.

The gate insulating layer 113 is formed on the common line 102, the gate line 103, the gate electrode 111 and the auxiliary common electrodes 106. The semiconductor layer 115 is formed on the gate insulating layer 113 over the gate electrode 111. The semiconductor layer 115 includes an active layer 115a of intrinsic silicon and an ohmic contact layer 115b of impurity-doped silicon. Further, the source and drain electrodes 117 and 119 are formed on the semiconductor layer 115 and the data line 104 is formed on the gate insulating layer 113. The source and drain electrodes 117 and 119 are spaced apart from each other, and the data line 104 crosses the gate line 103 to define the pixel region P. The data line 104 may be spaced apart from the outermost common electrodes 106. The gate electrode 111, the gate insulating layer 113, the semiconductor layer 115, the source electrode 117 and the drain electrode 119 constitute the thin film transistor (TFT) Tr.

The drain electrode 119 extends to overlap the common line 102. Overlapping portions of the common line 102 and the drain electrode 119 are used as first and second capacitor electrodes 102a and 109a, respectively, such that the first and second capacitor electrodes 102a and 109a and the gate insulating layer 113 between the first and second capacitor electrodes 102a and 109a constitute a storage capacitor StgC. Although the semiconductor layer 115 including the active layer 115a and the ohmic contact layer 115b are further interposed between the gate insulating layer 113 and the second capacitor electrode 109a in FIGS. 5 and 6, the semiconductor layer under the second capacitor electrode 109a may be omitted through a difference fabrication process in another embodiment. In addition, although the semiconductor layer 115 including the active layer 115a and the ohmic contact layer 115b are further interposed between the gate insulating layer 113 and the data line 104 in FIGS. 5 and 6, the semiconductor layer under the data line 104 may be omitted through a difference fabrication process in another embodiment.

A passivation layer 121 of an inorganic insulating material is formed on the data line 104, the source electrode 117 and the drain electrode 119, and the black matrix 200 of an inorganic material is formed on the passivation layer 121. The black matrix 200 may correspond to the common line 102, the gate line 103, the data line 104 and the TFT Tr. Further, the black matrix 200 is formed of an inorganic material including germanium (Ge). For example, the inorganic material may include one of germanium (Ge), germanium carbide (GeC) and germanium silicon (GeSi). Since the transmittance of a thin film of an inorganic material is smaller than the transmittance of a thin film of an organic material such as black resin, the black matrix 200 of an inorganic material has a relatively smaller thickness as compared with the black matrix 30 (of FIG. 2) of black resin according to the related art. As a result, a step difference due to the black matrix 200 is minimized and deterioration in a subsequent process such as a rubbing process due to the step difference is prevented. Accordingly, an overcoat layer for planarization is omitted and a fabrication process is simplified.

For the sufficient light shielding property, the black matrix 200 is required to have an optical density within a predetermined range. The optical density OD is defined as a ratio of an output intensity $I_{out}$ of transmitted light to an input intensity $I_{in}$ of incident light according to a following equation I.

$$OD = -\log(I_{out}/I_{in}) \qquad \text{equation I}$$

For a given input intensity of incident light, as an output intensity of transmitted light decreases, an optical density increases.

For example, the black matrix 200 may be required to have an optical density equal to or greater than about 4.0, preferably, equal to or greater than about 5.0 in order that the black matrix 200 can prevent mixing of colors by the color filters and malfunction of the TFT Tr due to light leakage. For the optical density equal to or greater than about 4.0, although the black matrix 30 of black resin according to the related art has a thickness of about 1 μm to about 2 μm the black matrix 200 of an inorganic material may have a thickness of about 2000 Å to about 5000 Å. For example, the black matrix 200 of an inorganic material having a thickness of about 3000 Å may have an optical density equal to or greater than about 4.0. Accordingly, a thickness of the black matrix 200 of an inorganic material is reduced and a step difference due to the black matrix 200 is mitigated.

Table 1 shows optical densities of the black matrix 200 with respect to a wavelength of incident light in a COT type IPS mode LCD device according to a first embodiment of the present invention.

TABLE 1

| wavelength | 450 nm | 550 nm | 610 nm |
|---|---|---|---|
| optical density | 5.3 | 5.3 | 4.0 |

In Table 1, the black matrix 200 is formed of germanium (Ge) and has a thickness of about 3000 Å.

As shown in Table 1, the black matrix 200 of germanium (Ge) has a relatively high optical density of about 5.3 at the wavelengths of about 450 nm and about 550 nm. In addition, the black matrix 200 of germanium (Ge) has an optical density of about 4.0, which is similar to the optical density of the black matrix 30 of black resin having a thickness of about 1 μm to about 2 μm, at a wavelength of about 610 nm. Accordingly, the black matrix 200 of an inorganic material has a superior light shielding property even with a smaller thickness as compared with the black matrix 30 of black resin according to the related art.

In addition, the black matrix 200 of an inorganic material has a smaller dielectric constant and a greater resistivity as compared with the black matrix 30 of black resin according to the related art. As a result, a resistive-capacitive (RC) delay in the conduction line such as the common line 102, the gate line 103 and the data line 104 is reduced. For example, the black matrix 200 of an inorganic material may have a resistivity equal to or greater than about $1 \times 10^{15}$ Ωcm.

Table 2 shows a rising time and a falling time of a signal transmitted through the data line 104 in a COT type IPS mode LCD device according to a first embodiment of the present invention.

TABLE 2

|  | rising time (Tr, μsec) | falling time (Tf, μsec) | rising time + falling time (Tr + Tf, μsec) |
|---|---|---|---|
| reference value | 0.8 | 0.8 | 1.6 |
| data line + black matrix of black resin | 1.6 | 1.6 | 3.2 |
| data line + black matrix of inorganic material | 1.0 | 0.8 | 1.8 |

In Table 2, the rising time and the falling time are measured for a signal transmitted through the data line on which the passivation layer and the black matrix are sequentially formed. When the black matrix 30 of black resin according to the related art is formed over the data line, the rising time, the falling time and the sum of the rising and falling times of the signal are about 1.6, about 1.6 and about 3.2, respectively, which are about twice of the reference values. When the black matrix 200 of an inorganic material is formed over the data line, the rising time, the falling time and the sum of the rising and falling times of the signal are about 1.0, about 0.8 and about 1.8, respectively, which are similar to the reference values. Accordingly, the RC delay of the signal transmitted through the data line 104 is minimized and deterioration in display quality such as non-uniform contrast ratio and non-uniform brightness is prevented.

A color filter layer 133 including red, green and blue color filters is formed on the black matrix 200 and the passivation layer 121. Although the color filter layer 133 is shown to contact a side surface of the black matrix 200 in FIGS. 5 and 6, an edge portion of the color filter layer 133 may be formed on the black matrix 200 to overlap the black matrix 200. The red, green and blue color filters may be formed on the passivation layer 121 exposed through the black matrix 200 and may be disposed in the pixel region P sequentially and repeatedly. The color filter layer 133 and the passivation layer 121 have the drain contact hole 127 exposing the second capacitor electrode 119a extending from the drain electrode 119, and the black matrix 200, the passivation layer 121 and the gate insulating layer 113 have the common line contact hole 129 exposing the common line 102.

The plurality of pixel electrodes 123, the plurality of common electrodes 125 and the auxiliary common electrodes 125a are formed on the black matrix 200 and the color filter layer 133. The plurality of pixel electrodes 123, the plurality of common electrodes 125 and the auxiliary common electrodes 125a may include a transparent conductive material and may be disposed parallel to the data line 104. The plurality of pixel electrodes 123 are connected to the second capacitor electrode 119a through the drain contact hole 127 such that the plurality of pixel electrodes 123 are electrically connected to the drain electrode 119. The plurality of common electrodes 125 are alternately disposed with the plurality of pixel electrodes 123 in the pixel region. The auxiliary common electrodes 125a are disposed at the edge portions of the pixel region P to overlap the outermost common electrodes 106 and are connected to the common line 102 through the common line contact hole 129. The end portions of the auxiliary common electrodes 125a and the plurality of common electrodes 125 are connected to common connecting pattern 125b (of FIG. 4).

In the COT type IPS mode LCD device, since the black matrix 200 and the color filter layer 133 are formed on the substrate 101 having the TFT Tr, the width of the black matrix 200 is minimized and the reduction in aperture ratio due to the attachment error is prevented. In addition, since the black matrix 200 includes an inorganic material, the black matrix 200 has a sufficient shielding property (a relatively great optical density) even with a relatively small thickness. As a result, the step difference due to the black matrix 200 is minimized and deterioration in a subsequent process such as rubbing process due to the step difference is prevented. Further, a fabrication process is simplified by omitting an overcoat layer for planarization. Moreover, since the black matrix 200 of an inorganic material has a relatively great resistivity and a relatively small dielectric constant, the RC delay is minimized and display quality is improved.

Figure 7:
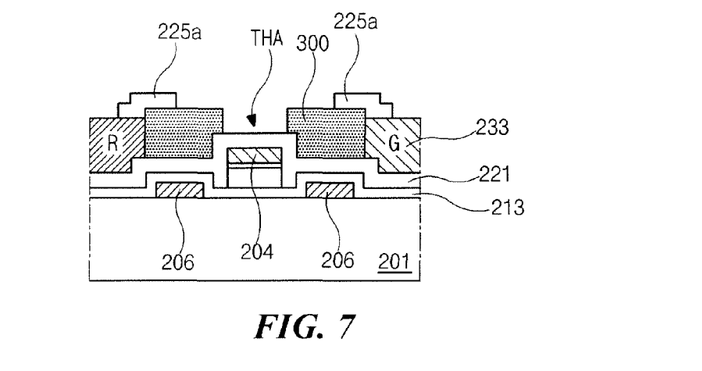
FIG. 7 is a cross-sectional view showing a color filter on thin film transistor type in-plane switching mode liquid crystal display device according to a second embodiment of the present invention.

FIG. 7 is a cross-sectional view showing a color filter on thin film transistor type in-plane switching mode liquid crystal display device according to a second embodiment of the present invention. FIG. 7 shows portions adjacent to a data line because the other portions are similar to those of the first embodiment.

In FIG. 7, outermost common electrodes 206 are formed at edge portions of a pixel region on a substrate 201, and a gate insulating layer 213 is formed on the outermost common electrodes 206. A data line 204 is formed on the gate insulating layer 213. The outermost common electrodes 206 are disposed at both sides of the data line 204. A passivation layer 221 is formed on the data line 204, and a black matrix 300 of an inorganic material is formed on the passivation layer 221. The black matrix 300 covers a space between the data line 204 and the outermost common electrodes 206 so that light leakage through the space can be prevented. In addition, the black matrix 300 has a through hole THA corresponding to the data line 204 such that the passivation layer 221 over the data line 204 is exposed.

A color filter layer 233 including red, green and blue color filters is formed on the passivation layer 221 and the black matrix 300, and auxiliary common electrodes 225a are formed on the color filter layer 233 and the black matrix 300. Although the color filter layer 233 is shown to contact a side surface of the black matrix 300 in FIG. 7, an edge portion of the color filter layer 233 may be formed on the black matrix 300 to overlap the black matrix 300. The red, green and blue color filters may be formed on the passivation layer 221 exposed through the black matrix 300 and may be disposed in the pixel region P sequentially and repeatedly. The auxiliary common electrodes 206 overlap the outermost common electrodes 225a.

In the COT type IPS mode LCD device of the second embodiment, since the black matrix 300 is not disposed directly over the data line 204 and the passivation layer 221 directly over the data line 204 is exposed, a resistive-capacitive (RC) delay is further improved. As illustrated in Table 2 of the first embodiment, when the black matrix 200 (of FIG. 6) is formed directly over the data line 104 (of FIG. 6), the sum of the rising time and the falling time of about 1.8 μsec is slightly longer than the reference value of about 1.6 μsec. In the second embodiment, since the black matrix 300 directly over the data line 204 is removed, the sum of the rising time and the falling time may be substantially the same as the reference value.

Consequently, in a COT type IPS mode LCD device of the present invention, since a thin film transistor, a black matrix and a color filter layer are formed on a single substrate, a margin for attachment error is not required. As a result, a width of the black matrix is minimized and aperture ratio is improved. In addition, since the black matrix is formed of an inorganic material, the black matrix has a relatively great optical density even with a relatively small thickness. As a result, a step difference due to the black matrix is minimized and deterioration in a subsequent process such as a rubbing process due to the step difference is prevented. Further, a fabrication process is simplified by omitting an overcoat layer for planarization. Moreover, since the black matrix of an inorganic material has a relatively great resistivity and a relatively small dielectric constant, a resistive-capacitive delay is minimized and a display quality is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
   a substrate;
   a gate line and a data line on the substrate, the gate line and the data line crossing each other to define a pixel region;
   a common line parallel to and spaced apart from the gate line;
   a thin film transistor connected to the gate line and the data line;
   a plurality of pixel electrodes in the pixel region, the plurality of pixel electrodes connected to the thin film transistor and parallel to the data line;
   a plurality of common electrodes alternating with the plurality of pixel electrodes;
   at least one outermost common electrode at an edge portion of the pixel region, the at least one outermost common electrode is extended from and has a same layer as the common line and parallel to the data line;
   at least one auxiliary common electrode having a same layer and a same material as the plurality of common electrodes and electrically connected to the common line via a common line contact hole, wherein the at least one auxiliary common electrode overlaps the at least one outermost common electrode;
   a black matrix corresponding to the thin film transistor, the gate line and the data line, the black matrix including an inorganic material and having an open portion; and
   a color filter layer in the open portion.

2. The array substrate according to claim 1, wherein the black matrix includes one of germanium (Ge), germanium carbide (GeC) and germanium silicon (GeSi).

3. The array substrate according to claim 1, wherein the black matrix has a resistivity equal to or greater than about $1 \times 10^{15}$ Ωcm.

4. The array substrate according to claim 1, wherein the black matrix has an optical density of about 5.3 at a wavelength of about 550 nm.

5. The array substrate according to claim 1, wherein the black matrix has a thickness of about 2000 Å to about 5000 Å.

6. The array substrate according to claim 1, wherein the at least one outermost common electrode is disposed at both sides of the data line.

7. The array substrate according to claim 6, wherein the black matrix has a through hole corresponding to the data line.

8. The array substrate according to claim 1, wherein the thin film transistor includes a gate electrode connected to the gate line, a gate insulating layer on the gate electrode, a semiconductor layer on the gate insulating layer over the gate electrode, a source electrode connected to the data line and a drain electrode spaced apart from the source electrode and connected to the plurality of pixel electrodes.

9. The array substrate according to claim 8, wherein the drain electrode overlaps the common line with the gate insulating layer interposed between the drain electrode and the common line.

10. The array substrate according to claim 1, wherein the black matrix corresponds to the at least one outermost common electrode and a space between the data line and the at least one outermost common electrode.

* * * * *